United States Patent
Thiebaut et al.

(10) Patent No.: US 10,867,211 B2
(45) Date of Patent: Dec. 15, 2020

(54) METHOD FOR PROCESSING A STREAM OF VIDEO IMAGES

(71) Applicant: Idemia Identity & Security France, Courbevoie (FR)

(72) Inventors: Maxime Thiebaut, Courbevoie (FR); Vincent Despiegel, Courbevoie (FR); Dora Csillag, Courbevoie (FR)

(73) Assignee: Idemia Identity & Security France, Courbevoie (FR)

( * ) Notice: Subject to any disclaimer, the term of this patent is extended or adjusted under 35 U.S.C. 154(b) by 40 days.

(21) Appl. No.: 16/420,960

(22) Filed: May 23, 2019

(65) Prior Publication Data

US 2019/0362183 A1      Nov. 28, 2019

(30) Foreign Application Priority Data

May 23, 2018 (FR) ..................... 18 54286

(51) Int. Cl.
  *G06K 9/62* (2006.01)
  *G06K 9/00* (2006.01)
  *G06T 7/20* (2017.01)

(52) U.S. Cl.
  CPC ....... *G06K 9/6228* (2013.01); *G06K 9/00369* (2013.01); *G06K 9/00744* (2013.01);
  (Continued)

(58) Field of Classification Search
  CPC .......................... G06F 3/0425; H04N 13/156
  (Continued)

(56) References Cited

U.S. PATENT DOCUMENTS 7,471,827 B2 * 12/2008 Xie ..................... G06F 16/9577
                                                        382/173
8,363,939 B1    1/2013 Khosla et al.
(Continued)

FOREIGN PATENT DOCUMENTS

WO    WO 2016/156236 A1    10/2016

OTHER PUBLICATIONS

French Preliminary Search Report dated Feb. 25, 2019 in French Application 18 54286 filed on May 23, 2018 (with English Translation of Categories of Cited Documents).

*Primary Examiner* — Kiet M Doan
(74) *Attorney, Agent, or Firm* — Oblon, McClelland, Maier & Neustadt, L.L.P.

(57) ABSTRACT

A method for processing a stream of video images to search for information therein, in particular detect predefined objects and/or a motion, comprising the steps of:
  a) supplying at least one attention map in at least one space of the positions and of the scales of at least one image of the video stream,
  b) selecting, in this space, points to be analyzed by making the selection depend at least on the values of the coefficients of the attention map at these points, at least some of the points to be analyzed being selected by random draw with a probability of selection in the draw at a point depending on the value of the attention map at that point, a bias being introduced into the map to give a non-zero probability of selection at any point,
  c) analyzing the selected points to search therein for said information,
  d) updating the attention map at least for the processing of the subsequent image, from at least the result of the analysis performed in c),
(Continued)

e) reiterating the steps a) to d) for each new image of the video stream and/or for the current image on at least one different scale.

14 Claims, 3 Drawing Sheets

(52) U.S. Cl.
CPC ...... *G06T 7/20* (2013.01); *G06T 2207/10016* (2013.01); *G06T 2207/30196* (2013.01)

(58) Field of Classification Search
USPC ........... 382/162, 278, 164; 345/156, 135, 51
See application file for complete search history.

(56) References Cited

U.S. PATENT DOCUMENTS

| | | |
|---|---|---|
| 9,740,949 B1 | 8/2017 | Khosla et al. |
| 2005/0047647 A1* | 3/2005 | Rutishauser ......... G06K 9/4628 |
| | | 382/159 |
| 2006/0215922 A1* | 9/2006 | Koch ....................... G06T 7/12 |
| | | 382/248 |
| 2010/0086200 A1 | 4/2010 | Stankiewicz et al. |
| 2010/0086221 A1 | 4/2010 | Stankiewicz et al. |
| 2010/0086278 A1 | 4/2010 | Stankiewicz et al. |
| 2013/0084013 A1 | 4/2013 | Tang |
| 2017/0193281 A1* | 7/2017 | Csefalvay .......... G06K 9/00234 |

* cited by examiner

STATE OF THE ART

METHOD FOR PROCESSING A STREAM OF VIDEO IMAGES

The present invention relates to the processing of a video stream in order to analyze the images therein.

It involves, for example, extracting video records of information useful to enquirers, making it possible to identify pedestrians or other objects.

With the increasing number of cameras and the improvement of resolution, the volume of video data to be processed is becoming considerable and the analysis thereof to find relevant information requires significant hardware and human resources.

FIG. 1 illustrates a processing method of the prior art. Each image of the video stream undergoes a detection processing which aims to identify predefined objects, for example pedestrians or the like, in the image.

The aim of the detection algorithm is to give detection results in terms, typically, of position in the image, for example x, y, and of size, for example height, width. The space of the positions and of the scales may be represented by a 4-tuple, for example x, y, width, height, but it is possible to generalize to more complex forms.

FIG. 2 shows two detection results in such a space, the first detection having the coordinates (x1, y1, width1, height1) therein, and the second (x2, y2, width2, height2).

A recognition analysis may possibly be performed on these objects, in order for example to identify a face or to read the registration plate of a vehicle.

To reduce the processing times at the hardware level, it is possible to reduce the number of pixels analyzed by performing a decimation of the video stream, either spatially by redimensioning or by realigning the images, or temporally by sampling the images, for example by processing one image in every n images, n being typically between 2 and 5.

Such a decimation does however degrade the detection capability and tends to increase the false acceptances. In particular, the redimensioning of the image at the start of processing has an impact on the capability to detect objects of small size, whereas the decimation consisting in retaining only one image in n has an impact on the tracking and detection performance levels.

The application WO 2017/005930 A1 discloses a method for detecting objects, in particular pedestrians, for a processing comprising the scanning of an image by a sliding window of predetermined fixed size, linked to the detection scale. The scanning is performed according to a predefined cycle. First of all, each region of interest of a first subset having given rise to the detection of an object is memorized. Next, the analysis is reiterated for the subsequent images on a second subset of regions of interest, consisting on the one hand of previously memorized regions of interest and of regions of interest contiguous thereto, and on the other hand of regions of interest obtained by moving the sliding window. Such a deterministic detection method is not fully satisfactory, in as much as the process of the detection cycle may prove unfavorable to the rapid detection of objects appearing in new areas of the image. Furthermore, the detection is performed on windows of imposed form, which limits the detection capability.

There is consequently a need to benefit from a solution that makes it possible to optimize the processing time and/or improve the detection performance levels, in particular by reducing the rate of false acceptances.

The invention addresses this need by virtue of a method for processing a stream of video images to search for information therein, in particular detect predefined objects and/or a motion, comprising the steps of:

a) supplying at least one attention map in at least one space of the positions and of the scales of at least one image of the video stream, b) selecting, in this space, points to be analyzed by making the selection depend at least on the values of the coefficients of the attention map at these points, at least some of the points to be analyzed being selected by random draw with a probability of selection in the draw at a point depending on the value of the attention map at that point, a bias being introduced into the map to give a non-zero probability of selection at any point, c) analyzing the selected points to search therein for said information, d) updating the attention map at least for the processing of the subsequent image, from at least the result of the analysis performed in c), e) reiterating the steps a) to d) for each new image of the video stream and/or for the current image on at least one different scale.

The method according to the invention makes it possible to devote on average more time to the pixels of the image which have a greater probability of containing the information sought, independently of the technique used for the detection.

The attention map may be initialized by giving the same value for all the points, for a given detection scale, for example a value equal to the bias. The latter may make it possible to guarantee a detection rate equal to a detection rate excluding optimization, to within a detection latency. That makes it possible to analyze all the regions of the image in a first stage, before then concentrating the search on certain areas. For a point where, because of the result of the draw and of the value of the coefficient of the attention map at this point, no positive detection is made, the value of the coefficient may be unchanged for this point on the detection scale concerned, and for example equal to the bias. By contrast, when a positive detection is made at a point, the value of the coefficient at this point is updated and modified to take a value leading to a higher frequency of analysis.

The bias, which consists in giving a non-zero value to each coefficient of the attention map, ensures that all the pixels end up being processed on account of the random draw. The method in this way devotes a minimum of time to the pixels other than those which are made to be processed most frequently through the corresponding values of the attention map. Thus, the bias nevertheless causes a certain computation time to be devoted to each pixel.

The values of the coefficients of the attention map and in particular the choice of the value of the bias are a function of the nature of the objects to be detected and of the manner in which the detection is made. The computation of the values of the coefficients of the attention map is preferably performed by learning from a database representative of the type of detection that is sought, for example of the nature of the objects sought and/or of the motions on the image that are sought to be detected, this base being preferably chosen to maximize the detection performance levels while minimizing the computation times.

It is also possible to choose as bias value a value which depends on parameters, for example which is adaptive as a function of time and/or of the available resources or of the detection quality that is desired.

For example, if a greater detection quality is desired, the value of the bias may be modified to increase the frequency of analysis at any point.

The probabilistic approach to the choice of the pixels analyzed according to the invention offers great freedom in the choice of detection method. It is for example possible, if so desired, to apply an object detection method relying on the analysis of regions of interest or a detection method relying on a detection of motion, not involving regions of interest.

The random draw makes it possible not to prioritize any particular area among those where there is no a priori expectation of finding information. Thus, in the event of a change occurring in such an area, the latter may be detected rapidly.

This method is preferably implemented on several detection scales. The probability of finding, with the analysis of a given pixel, sought information may in fact vary with the size of the object that is sought to be detected. The computation of the coefficients of the attention map may be made to depend on the result of at least one preceding detection and/or on the values of the coefficients of at least one preceding attention map. For example, in the updating of the attention map, a coefficient of the attention map at a point may be given a value leading to a frequency of analysis that becomes higher as this point approaches, in the space of the positions and of the scales (x, y, height, width), a positive detection. The notion of proximity is a function which is defined for each type of detection, and this function may be learned from representative data. For example, for an algorithm of simultaneous vehicle and pedestrian detection, the notion of proximity is not the same for the vehicle and the pedestrian, because the expected speeds of these objects are different. It is possible to dynamically adapt the parameters defining the notion of proximity, as a function for example of the measured speed of the objects and/or of a preliminary calibration of the camera.

It is also possible to introduce a statistical bias which is static in the space, for example if the aim is to permanently prioritize a given area in the field of view of the camera, for example at the center thereof. Such a static bias is for example a function of the coordinates x, y, of the height and of the width of the object, which makes it possible to prioritize, in a given area of the field of view for example at the center of the image, objects of a given size. The invention may be applied to the detection of objects, such as pedestrians for example.

As a variant, the invention applies to the detection of motions on an image.

It may concern any type of object, for example pedestrian, animal, vehicle, etc.

As a function of the result of the detection for a given image on a given scale, it is possible to define at least one region of interest in this image on this scale, and, for the processing of at least one subsequent image, the attention map on this scale is updated on the basis of this region of interest, in particular by applying a predefined value chosen as a function of the value of the bias to all the points of this attention map corresponding to this region of interest on this scale.

The value of the attention map at a point may be given by the following formula, whatever the nature of the object and the corresponding detection algorithm, for example suitable for detecting pedestrians or for detecting motion:

$$\text{attention\_map}(t+1) = \max(\text{probability}_{bias}, \text{temporal\_filter}(\text{proximity\_function}(\text{algo\_output}(i))_{i<=t})) \quad (1)$$

In this expression, "attention_map(t+1)" denotes the attention map, consistent with a probability map, at the instant t+1, being calculated from data at the instant t or at preceding instants.

In an exemplary implementation, a 1 value at a point indicates a maximum attention to the subsequent image, whereas a 0 value reflects zero attention.

The "max" function corresponds to the maximum function.

"proximity_function" denotes a function which transforms an algorithm output into a probability map.

In an exemplary implementation, this function gives high values in proximity to a detection. In this case, the maximum value of the attention map may be 1. It may also be adapted to external parameters such as the speed of motion of the objects or the configuration of the scene.

The expression "algo_output(i)" denotes the output of the detection algorithm at the instant i. It may concern encompassing boxes, segmentation, motion map, etc.

The "temporal_filter" function denotes a temporal filter whose objective is to merge several probability maps, typically by giving a higher weight to the near instants (t, t−1, t−2, . . . ). This may make it possible to take a decision as to the choice of whether or not to proceed with the analysis of a point which takes into account a certain history of the detections at this point or in proximity for example. In the context of the detection of objects in particular, it is possible for example to perform a first search on the image on a first scale, that is to say with x,y variable for l and h, which characterize the detection scale, fixed in the space (x,y,l,h), where x and y are the coordinates in the image and l and h are the width and the height of the detection window, fixed for example at $l_1$ and $h_1$, then a second search on the image on a second scale, that is to say with x and y variable and l and h fixed respectively at other values $l_2$ and $h_2$ different from $l_1$ and $h_1$. A positive detection makes it possible to define a region of interest for the processing of at least one subsequent image. This region of interest may have at least the size of the detection. The state of the coefficients of the map relating to an area where a positive detection takes place may thus be updated for the subsequent image.

In an exemplary implementation and in the case of the detection of objects in particular, such as pedestrians for example, the coefficients of the attention map in this region of interest may take either an extreme value which forces the selection, for example the value 1, that is to say that the analysis is forced at this point in the space of the positions and scales, or the value of the bias otherwise, which amounts to performing the detection at a lower frequency, the number of successive images without detection at a given point depending on the bias. For example, the lower the bias, the greater the number of images of the video stream that are allowed to pass without analyzing the image at this point. The extreme value may be given at a point of the attention map for the processing of the image of rank N+1 in the video stream if the point concerned corresponds to a positive detection on the image N or is sufficiently close spatially and temporally to a positive detection on an earlier image. In a variant, the value which forces the detection, for example the value 1 as above, is replaced with a near but not extreme value, so as to save on the resources. In this case, the frequency of analysis remains relatively high there in the region of interest but the analysis does not take place systematically in the region of interest on each iteration.

A binary mask per detection scale may be generated in the step b) from the attention map, this binary mask being applied to at least one image of the stream to be analyzed in the step c), the analysis being performed on only the pixels that are not masked, all the pixels of the mask being preferably initialized with one and the same value corresponding to the absence of masking.

According to an aspect of the invention defined above, a draw is performed to select at least some of the points on which the analysis is performed, in particular to determine the pixels of the image situated outside of the areas of interest on which the analysis is performed. This draw may take place for on each coefficient of the attention map or only for those whose value is not extreme to the point of forcing the analysis at this point, and the result of the comparison of this draw with the value of the coefficient determines the value of the binary mask. "Draw" denotes the generating of numbers lying between certain limits, for example between 0 and 1. This draw is random. There is thus a random decimation of the video stream outside of the areas of interest, and a random selection of the pixels analyzed, with a higher probability of analysis of the pixels in the area or areas of interest, by virtue of the fact that the values of the attention map are taken into account in the creation of the mask.

As mentioned above, the attention map may be initialized by giving the same value for all the pixels. That makes it possible to analyze all the regions of the image in a first stage, before then concentrating the search on the regions of interest. The values taken by the coefficients of the attention map depend on the result of the detection. The value assigned to a coefficient associated with a pixel on a detection scale may depend on the states of this pixel in the preceding images and on the result of the detection. For example, the value of a coefficient of the attention map associated with a given pixel on a detection scale at a given instant may be all the more extreme, in particular high, when there has been a detection close to this pixel on the image, and/or when a confidence score without the threshold (that is to say non-binary) of this pixel or in a vicinity of this pixel in the image, on a detection scale and at a detection instant, is high. That may be the case for example for motion detection, where it is possible to work directly on a map without thresholds, with a detection algorithm which operates at the pixel level. That may also be the case for the detection of pedestrians, if operating also at the pixel level.

As stated above, the frequency of analysis with which the analysis is performed excluding the region or regions of interest is controlled by the introduction of a bias into the attention map outside of the region or regions of interest. This bias corresponds to the value given by the attention map to each pixel of the image on a given detection scale. The presence of the bias ensures that all the pixels of the image are analyzed after a certain latency time, even if the probability of these pixels containing the information sought is low. Thus, a new object entering into the field of the camera will not be detected immediately, but will be detected on the subsequent images.

The bias may thus be chosen so as to ensure an analysis of all the pixels excluding the region or regions of interest with a latency time of m images, with m lying between 3 and 10 images, preferably equal to 5. In other words, each pixel is analyzed on average at the latest at every m images. A value of 5 is relatively transparent in terms of algorithmic detection performance or of user experience in the case of the detection and tracking of pedestrians with a 25 image/s video. The frequency of analysis corresponds to the inverse of the latency time. In the regions of interest, the frequency of analysis may be 1, that is to say that a given pixel of these regions of interest is analyzed for each image of the video stream, or close to 1, that is to say that a given pixel is analyzed on average every n images, with n close to 1, whereas, outside of the regions of interest, a given pixel is analyzed on average every k images, with k>n. For a pixel where, because of the result of the draw and the value of the coefficient of the attention map, no detection is performed, the value of the coefficient may remain unchanged for this pixel and this detection scale. By contrast, when a detection is performed in a given area, the state of the coefficients of the map relating to this area is updated as a function of the detection characteristics.

When the detection is positive in at least two nearby regions of interest, the method preferably comprises the merging of these regions of interest and the corresponding updating of the associated coefficients of the attention map for the processing of at least one subsequent image.

When the detection is positive at at least one point in the space of the positions and of the scales for a given image, the method preferably comprises the generation of a wider region of interest relative to the dimensions of an analysis window given by the scale on which the analysis is performed, and the corresponding updating of the associated coefficients of the attention map for the processing of the subsequent image. Each region of interest may thus be determined by taking a wider area of the image around a previously detected item of information sought. In this way, the fact that an object previously detected is likely to move on the image is anticipated, and the size of the wider area is chosen such that it encompasses the possible motion of the object on the image. For example, if the item of information previously detected is a pedestrian, the wider area may be a rectangle which encompasses this pedestrian.

The wider area of interest may be determined by morphological expansion. In particular, at least one region of interest associated with a detected object may be determined by a morphological expansion of this detected object. The parameters of the morphological expansion may be fixed or variable, and in particular depend on the size of the region of interest. The size of a region of interest may be at least twice, even three or more, times that of a previously detected object which is located within.

The determination of the regions of interest from the detections performed in the space of the positions and of the scales may be done according to rules determined by learning, using a database learned from representative data, as mentioned above. The choice of the form and of the dimensions of the abovementioned wider area may thus result from learning.

In the case of motion detection, each pixel of the image may be analyzed with a frequency which is determined by the values of the attention map.

The method according to the invention may be implemented with different image resolutions and independently for each of the pixels.

The attention map of the step a) may be computed from a map of probability of motion of the pixels of the image. The attention map is for example computed from this probability map and from a transfer function which controls the frequency of analysis of the pixels. The greater the probability of motion of a pixel on the image, the more the attention map will have, for this pixel, a value which leads to a frequent analysis of this pixel; on the other hand, a pixel which remains immobile in the images, because it corresponds for example to a fixed background, will have a low probability of motion and the attention map for this pixel will have a value chosen with a bias which leads to an analysis of this pixel with a frequency that is low but sufficient not to excessively degrade the detection capability of the system.

The attention map may be computed from the general formula (1) given above.

In a particular case, the attention map is computed from the motion probability map and from a transfer function, for example as follows:

$$map_{attention} = \max(probability_{bias}, expansion(map_{motion})).$$

The expansion concerned is for example morphological expansion.

For example, where the expansion is zero, it goes too far from the object, the value of the bias is taken as value for the associated coefficient of the attention map. Where the value resulting from the expansion is greater than the bias, this greater value is taken.

Another subject of the invention is a computer program product comprising a set of lines of instructions stored on a medium or that may be downloaded from a server, to, when run on a computer, provoke the processing of images according to the method according to the invention as defined above.

Another subject of the invention is a video processing system for implementing the method according to the invention, comprising at least one camera or one video recording system generating a video stream and a system for processing this video stream, comprising computing means such as a dedicated processor or a microcomputer for processing the images in order to search for a given item of information therein, configured to implement the method according to the invention, as defined above. In particular, this processing may take place in real time or not in real time.

The features of the invention mentioned in relation to the method are valid for the computer program product and the video processing system.

BRIEF DESCRIPTION OF THE FIGURES

The invention will be able to be better understood on reading the following detailed description, of nonlimiting exemplary implementations thereof, and on studying the attached drawing, in which.

Figure 1:
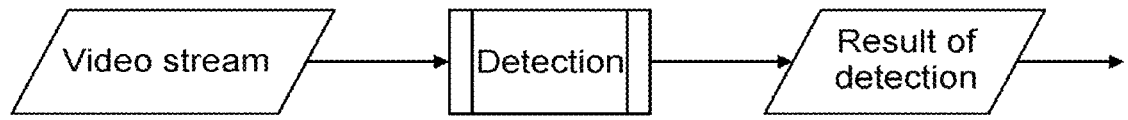
FIG. 1, previously described, corresponds to the prior art.
Figure 2:
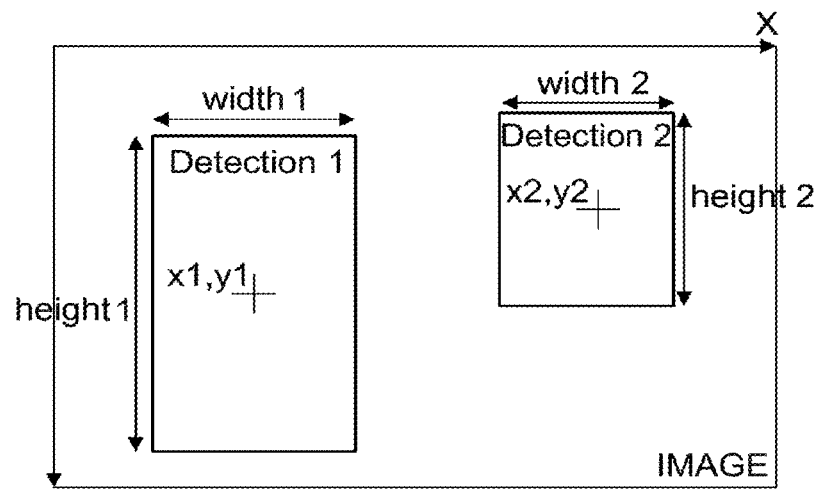
FIG. 2 illustrates the concept of space of positions and of scales on an image.

An example of a processing method according to the invention, intended to process a video stream V, will be described with reference to FIG. 3.

It concerns, for example, a video stream originating from video-surveillance cameras, and the aim is to search in the images of this stream for a given item of information, for example find an object having predefined characteristics, such as a pedestrian. As a variant, it concerns motion detection.

The method comprises a detection engine 10 which supplies a detection result 11. The detection engine may use different detection techniques, on different detection scales, depending on whether the aim is to detect an object such as a pedestrian for example or to perform a motion detection.

The detection engine 10 corresponds to an algorithm implemented in a microcomputer or a dedicated processor.

Among the detection techniques that may be used in the context of the detection of an object in particular, ACF (Aggregated Channel Features), DPM (Deformable Part Models), deep learning and others may be cited.

The article Fast Feature Pyramids for Object Detection by Piotr Dollar et al describes, in SUBMISSIONS TO IEEE TRANSACTIONS ON PATTERN ANALYSIS AND MACHINE INTELLIGENCE 2014 September, examples of techniques that may be used.

The article Fast Human Detection for Intelligent Monitoring Using Surveillance Visible Sensors by Byoung Chul Ko et al, published in Sensors 2014, 14, 21247-21257, discloses performing a detection of pedestrians by determining an optimal scale factor through the use of adaptive regions of interest.

The result of the detection, namely the presence of predefined objects in the images or the presence of a motion, may be, according to the applications, sent at point 12 to a higher level system, in order for example to process these objects with a view to identifying them.

Whether it be for the detection of objects or of motion, the method according to the invention relies on the use of at least one attention map in a given space of detection positions and scales. "Attention map" denotes a matrix whose coefficients are associated with points of the space of the positions and of the scales. The value of each coefficient is representative of the attention that should be paid to the detection algorithm at this point, in other words, a higher attention at the point where the information is likely to be located given the result of the analysis of the images previously performed, compared to the locations on the image where there is a low probability that the information sought is located in light of this result. This higher attention is reflected by a greater frequency of analysis of the pixels concerned.

The method comprises a step of updating each attention map for a given detection scale in light of the result 11 of the detection on that scale, this updating being able to be performed also if necessary by taking into account values previously taken by the map in the processing of the preceding images.

All the coefficients of the attention map may have been initialized with one and the same value, for example a non-zero bias h between 0 and 1, excluding bounds.

Figure 3:
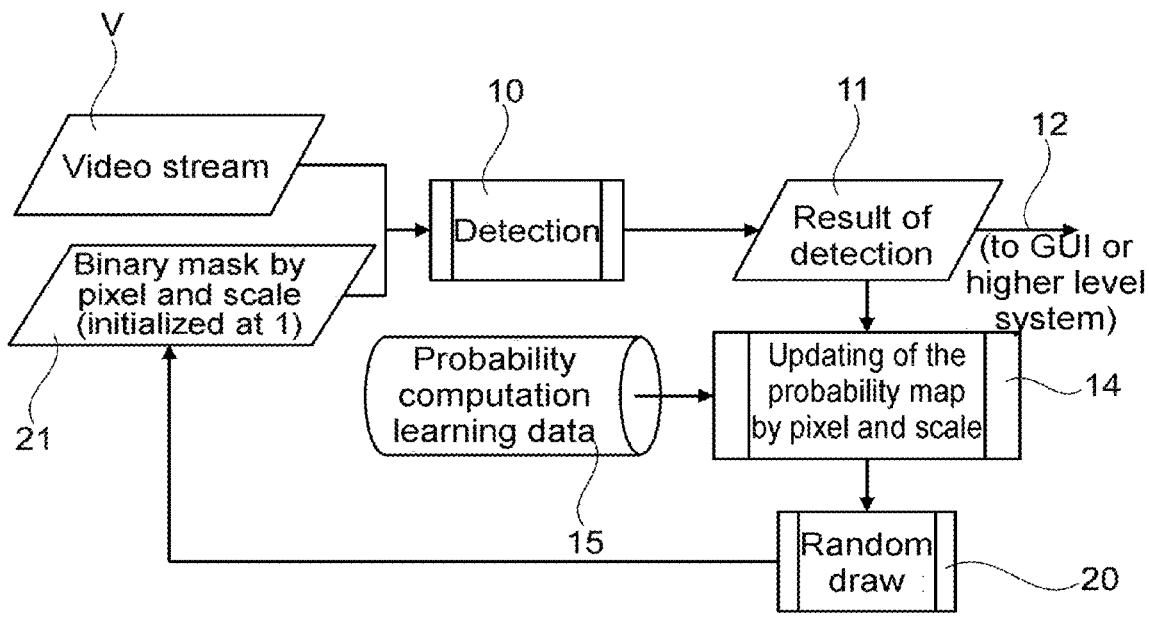
FIG. 3 is a block diagram illustrating an example of a method according to the invention.

The updating of the attention map in the step 14 in FIG. 3 is performed according to learned data 15. The learning of these data may be performed in various ways. It involves teaching the system where the probability of finding the information sought is the greatest given the nature and/or the location of the detected objects and their motion, as appropriate.

Figure 4A:
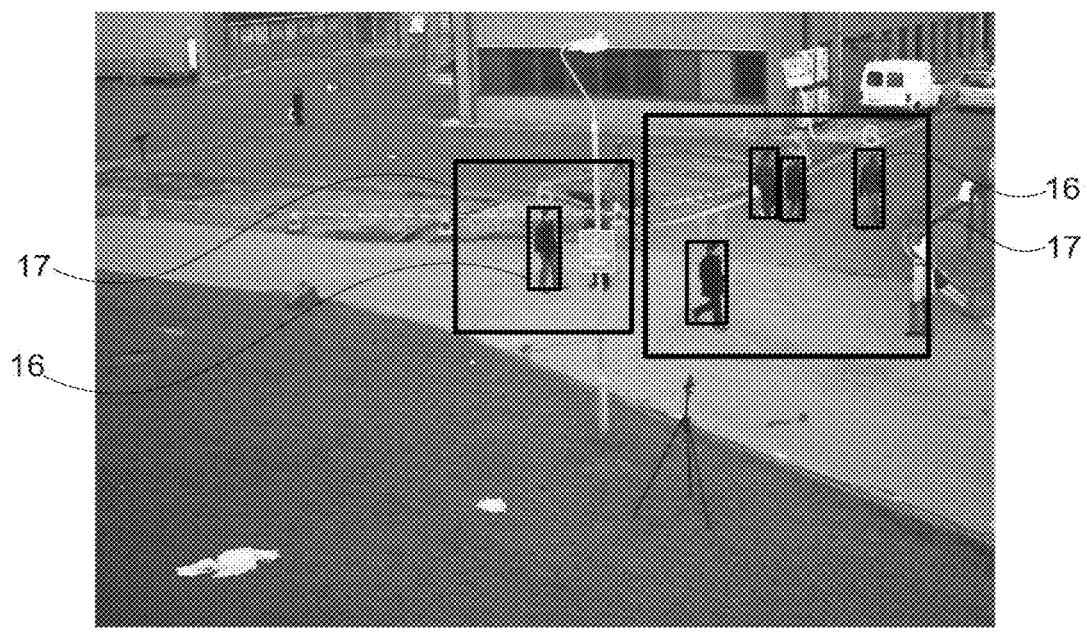
FIGS. 4A and 4B are two examples of images extracted from a video stream, in the context of the application of the invention to the detection of objects, on which the outline of the detected objects and of the areas of interest have been traced.

Referring to the example of FIG. 4A, which concerns the detection of objects, in the space of pedestrians, the detected objects have been marked on the image. These objects are delimited by rectangles 16, the long sides of which are vertical.

The updating of the attention map comprises the updating of the value of the coefficients of the attention map which correspond in this example to the pixels encompassed by these rectangles and which are analyzed.

Advantageously, in the example of the detection of pedestrians, wider regions of interest around the detected objects are defined to take account of the motion of these objects on the image, and thus ensure that, on the subsequent image, the analysis is focused preferentially on these regions.

The form of the wider regions of interest may result from a learning, and take account of the nature of the objects and/or their motion.

The wider regions of interest may be determined by subjecting the detected objects to a mathematical transformation, such as a morphological expansion for example.

FIG. 4A shows the outline 17 of the wider regions of interest. If, in computing the wider regions of interest associated with the different detected objects, area overlaps or nearby areas are obtained, these areas may be merged into a single area, which is the case with the area situated on the right in FIG. 4A. It may be seen that each wider region of interest occupies a surface area equal to several, for example at least three, times that of the object or objects contained within.

Figure 4B:
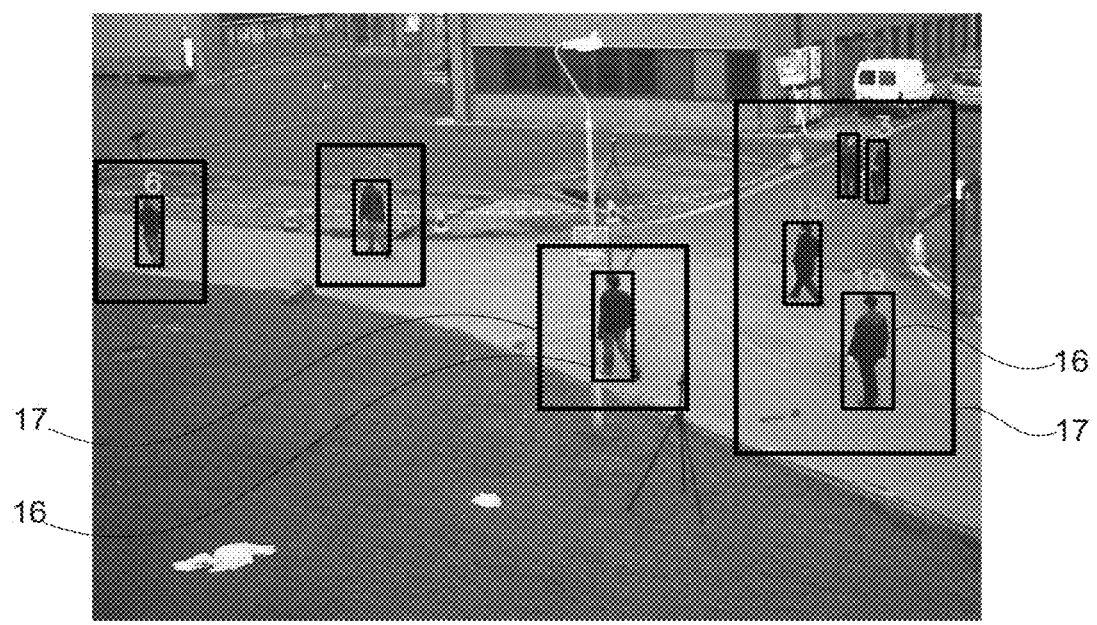

FIG. 4B represents an image originating from the same camera at a different instant. It may be seen that the wider regions of interest remain centered on the detected pedestrians.

The attention map has its coefficients in the wider regions of interest updated. A higher value is given to a coefficient to reflect a higher probability of the pixel associated with this coefficient of the attention map containing the information sought. All the coefficients of the attention map correspond to regions of interest that may, for example, take an extreme value c, for example a maximum value, and for example a value equal to 1, to force the detection at these points.

Several attention maps are thus updated after the processing of each image of the stream, given that there is, in the example considered, a map for each detection scale.

The next step is to ensure that the pixels situated in the areas of interest are analyzed more often than those outside of these areas.

However, areas outside of the regions of interest are regularly observed, to detect new objects which might just have appeared therein.

For that, a random draw 20 is performed for each detection scale as illustrated in FIG. 3, and, on the basis of this draw and of the attention map, a binary mask 21 is generated which will determine the areas where the detection will be performed, all the pixels of this mask being, in this example, initially at 1 to ensure that the initial detection 10 is applied to all the pixels of the image.

A random draw between 0 and 1 is for example conducted, and the value of this draw is compared to the value of the attention map at a point. By assuming for example that the bias b is 0.2, that the value of the coefficients of the attention map in the regions of interest is maximum and has the value c=1, the binary mask takes the value 1 when the draw is greater than the value of the coefficient of the attention map, which means that the corresponding pixel of the image is analyzed in the step 10. For example, by assuming a draw equal to 0.5, for a coefficient of the map corresponding to a pixel situated out of an area of interest, equal to 0.2, the mask takes the value 0 because, the value of the coefficient is lower than the draw; the corresponding pixel of the image is not analyzed in the step 10; for a draw equal to 0.1, the pixel is analyzed because the value of the coefficient is greater than the draw. For a coefficient of the attention map corresponding to a pixel situated in an area of interest, the draw is always less than 1 and the pixel will always be analyzed in the step 10. A pixel situated outside of an area of interest therefore leads to a binary mask which statistically will take the value 0 more often than a pixel situated in an area of interest. Thus, the pixels situated in the regions of interest will be analyzed on average more frequently than the others. The draw may be performed for all the pixels, but the decision is dependent on the attention map. The bias guarantees that there is no loss in detection. The value of the bias h conditions the latency time, that is to say the number of images which will be analyzed on average without a given pixel situated outside of an area of interest being analyzed. For example, this latency time is approximately 5 in the context of the detection of pedestrians for a video supplying 25 images/s; that means that, in the area of the image corresponding to the lawn bottom left in FIGS. 4A and 4B, a pixel is analyzed on average only every 5 images; it is understood there is a gain in efficiency in the processing, since a pointless analysis is avoided in the detection step 10 in an area where there is a low probability of a pedestrian moving around, the analysis being concentrated automatically on the regions where the probability of detecting pedestrians is highest from one image to another.

Figure 5:
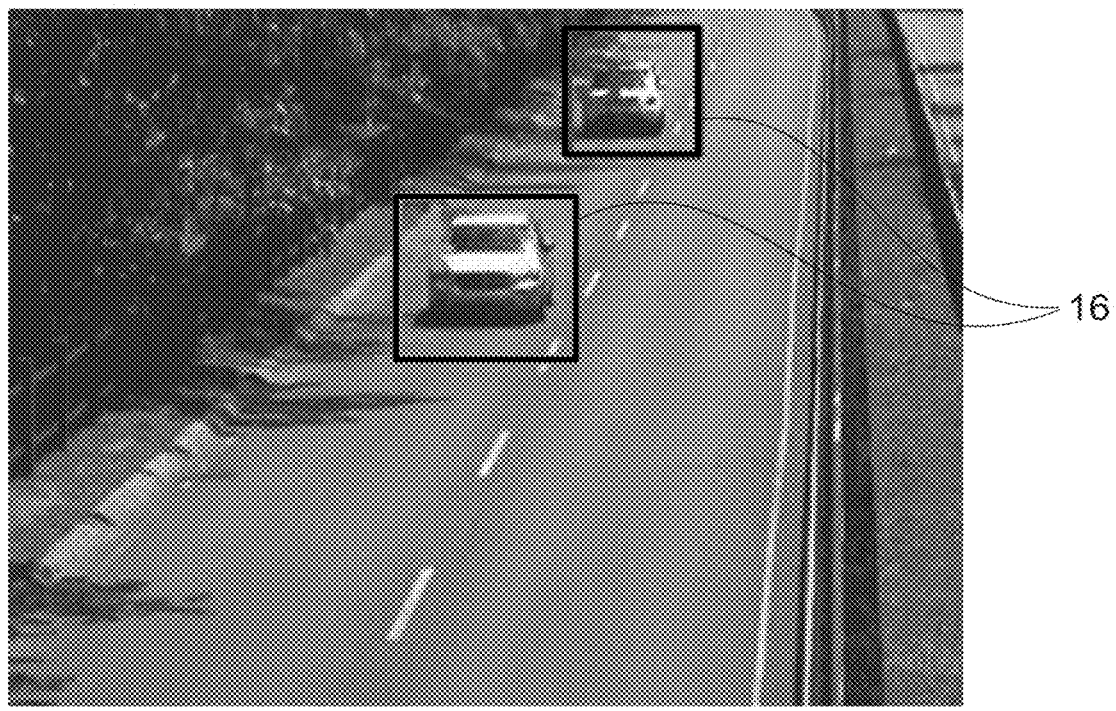
FIG. 5 is another example of an image in the case of the application of the invention to motion detection.
Figure 6:
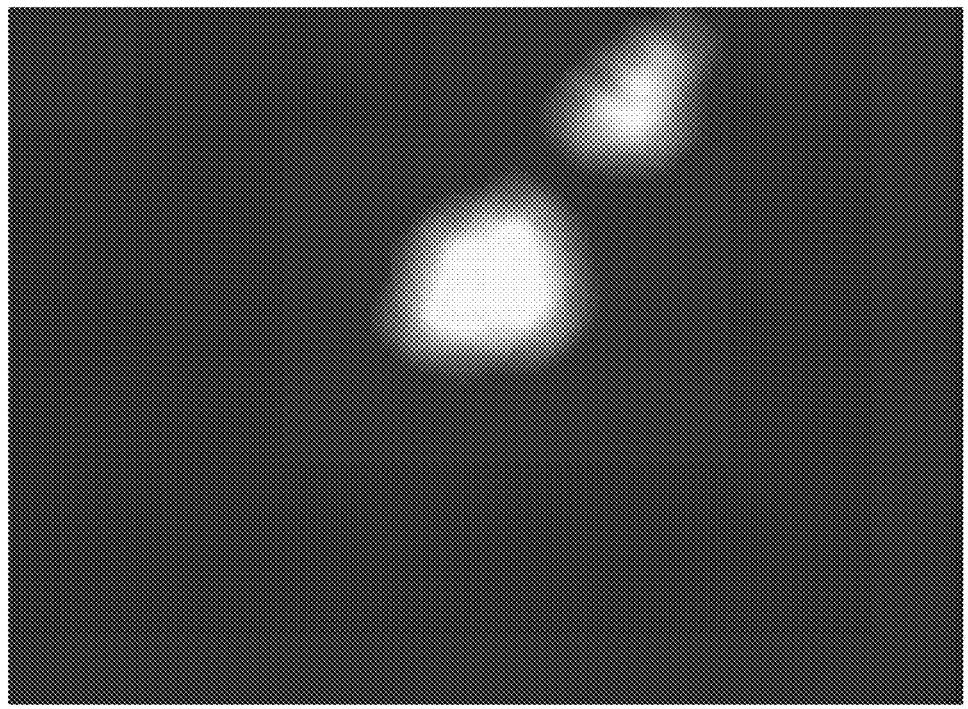
FIG. 6 represents the attention map corresponding to the image of FIG. 5.

When the method is applied to the detection of motion on the image, the computation of the coefficients of the attention map takes account of a motion probability map, as illustrated in FIG. 5. In this figure, there are objects 16 composed of two moving vehicles appearing on the image. FIG. 6 represents the motion probability map, computed from several preceding images of the video stream, from the response of each of the pixels. It may be seen that the detected motion probability is high at the vehicle level, and zero elsewhere.

The attention map may be computed from this motion probability map and from a transfer function, for example as follows:

$$\mathrm{map}_{attention} = \max(\mathrm{probability}_{bias}, \mathrm{expansion}(\mathrm{map}_{motion}))$$

The expansion concerned is for example morphological expansion.

Where the expansion is zero, because of being too far from the object, the value of the bias b is taken as value for the coefficient of the attention map. Where the value resulting from the expansion is greater than the bias b, this greater value is taken.

Obviously, the invention is not limited to the examples which have just been described.

The invention may in particular be applied to video streams other than those originating from surveillance cameras, for example a camera equipping a vehicle for the purpose of pedestrian avoidance.

The invention claimed is:

1. A method for processing a stream of video images to search for information therein to detect predefined objects and/or a motion, the method comprising the steps of:
   a) supplying an attention map in at least one space of positions and of scales of at least one image of the stream of video images;
   b) selecting, in this at least one space, points to be analyzed by making the selection depend at least on values of coefficients of the attention map at the points, at least one or more of the points to be analyzed being selected by a random draw with a probability of selection in the random draw at a point depending on a value of a coefficient of the attention map at the point, a bias being introduced into the attention map to give a non-zero probability of selection at any point;
   c) analyzing the selected points to search therein for said information;
   d) updating the attention map at least for processing of a subsequent image, from at least a result of the analysis performed in c);

e) reiterating the steps a) to d) for each new image of the video stream and/or for a current image on at least one different scale, wherein a computation of the coefficients of the attention map depends on a result of at least one preceding detection and/or on values of coefficients of at least one preceding attention map, and wherein, in the updating of the attention map, a coefficient of the attention map at a point is given a value that becomes higher as the point approaches, in the at least one space of the positions and of the scales, a positive detection.

2. The method according to claim 1, wherein the attention map is initialized by giving a same value for all the points, for a given detection scale, the same value being equal to the bias.

3. The method according to claim 1, wherein the steps a) through e) are applied to a detection of pedestrians.

4. The method according to claim 3, wherein the coefficients of the attention map take one of (i) an extreme value which forces the selection in each region of interest, and (ii) the value of the bias.

5. The method according to claim 3, wherein a binary mask per detection scale is generated in the step b) from the attention map for this detection scale, the binary mask being applied to at least one image of the stream of video images to be analyzed in the step c), the analysis being performed on only pixels that are not masked, all pixels of the binary mask being initialized with a same value corresponding to an absence of masking.

6. The method according to claim 3, wherein, as a function of the result of the detection for a given image on a given scale, at least one region of interest in the image on the scale is defined, and, for the processing of the subsequent image, the attention map on the scale is updated on the basis of the region of interest by adjusting all pixels of the region of interest on the scale to a value greater than the bias.

7. The method according to claim 6, wherein the detection is positive in at least two nearby regions of interest, the method further comprising merging of the regions of interest and a corresponding updating of the coefficients of the attention map for the processing of the subsequent image.

8. The method according to claim 3, wherein the detection is positive at at least one point in the at least one space of the positions and of the scales for a given image, the method further comprising generation of a wider region of interest relative to dimensions of an analysis window given by the scale on which the analysis in step c) is performed, and a corresponding updating of the coefficients of the attention map for the processing of the subsequent image.

9. The method according to claim 8, wherein the wider region of interest being determined by morphological expansion.

10. The method according to claim 9, wherein parameters of the morphological expansion are fixed.

11. The method according to claim 9, wherein parameters of the morphological expansion are dynamic depending on a size of the wider region of interest or on a speed of motion of an object.

12. The method according to claim 1, wherein steps a) through e) are applied to motion detection.

13. The method according to claim 1, wherein the attention map is calculated according to the following formula:

$$\text{attention\_map}(t+1) = \max(\text{probability}_{bias},$$

$$\text{temporal\_filter}(\text{proximity\_function}(\text{algo\_output}(i))_{i<t})).$$

14. A non-transitory computer readable medium having instructions stored therein, which when executed by a computer cause the computer to execute the method according to claim 1.

* * * * *